US012583586B2

(12) United States Patent
Schellaars

(10) Patent No.: US 12,583,586 B2
(45) Date of Patent: Mar. 24, 2026

(54) TANK ASSEMBLY AND HELICOPTER

(71) Applicant: Helitak Fire Fighting Equipment Pty Ltd, Lake MacDonald (AU)

(72) Inventor: Jason Schellaars, Lake MacDonald (AU)

(73) Assignee: HELITAK FIRE FIGHTING EQUIPMENT PTY LTD, Lake MacDonald (AU)

( * ) Notice: Subject to any disclaimer, the term of this patent is extended or adjusted under 35 U.S.C. 154(b) by 347 days.

(21) Appl. No.: 18/214,469

(22) Filed: Jun. 26, 2023

(65) Prior Publication Data

US 2024/0294257 A1 Sep. 5, 2024

(30) Foreign Application Priority Data

Mar. 1, 2023 (AU) ................................ 2023900530

(51) Int. Cl.
    *B64D 1/16*     (2006.01)
    *B64C 27/08*     (2023.01)

(52) U.S. Cl.
    CPC ................ *B64D 1/16* (2013.01); *B64C 27/08* (2013.01)

(58) Field of Classification Search
    CPC ....... B64D 1/16; A62C 3/0242; A62C 3/0235; A62C 3/0292; A62C 3/0228; B64C 27/08
    See application file for complete search history.

(56) References Cited

U.S. PATENT DOCUMENTS 12,304,632 B2 * 5/2025 Schellaars ............ A62C 3/0235
2022/0355931 A1 * 11/2022 Schellaars ............ B65D 90/623

FOREIGN PATENT DOCUMENTS

CN      113559437 A    10/2021
WO   2020124129 A1   6/2020

OTHER PUBLICATIONS

Kawak Aviation, Chinook CH-47D Helicopter Firefighting System, [https://www.youtube.com/watch?v=LCXOTuX9iKU], Oct. 30, 2018 (Year: 2018).*
Australian Patent Office Authorized Officer, International Search Report and Written Opinion for corresponding International Application No. PCT/AU2024/050166, Apr. 30, 2024, 10 pages.

* cited by examiner

*Primary Examiner* — Nicholas McFall
*Assistant Examiner* — Justin Michael Heston
(74) *Attorney, Agent, or Firm* — William A. English; VISTA IP LAW GROUP LLP

(57) ABSTRACT

There is provided a tank assembly for a helicopter. The tank assembly comprises a retractable tank for storing liquid or other substances, a first attachment mechanism, a second attachment mechanism and a third attachment mechanism. The retractable tank has an upper frame structure with forward and rearward ends. The first attachment mechanism, is attached to the upper frame structure towards the forward end and configured to engage a first cargo hook mount. The second attachment mechanism is attached to the upper frame structure towards the rearward end and configured to engage a second cargo hook mount. The third attachment mechanism is attached to the upper frame structure between the first and second attachment mechanisms and configured to engage a third cargo hook mount.

10 Claims, 8 Drawing Sheets

228
230c
232c
162
160
156
166
164
B-B 168b
168a
C
174
158
172
170
B-B

TANK ASSEMBLY AND HELICOPTER

TECHNICAL FIELD

The present disclosure relates to a tank assembly for a helicopter, and more particularly, a tank assembly comprising a retractable tank for storing liquid or other substances. The present disclosure also relates to a helicopter with a tank assembly attached thereto, the tank assembly comprising a retractable tank for storing liquid or other substances.

BACKGROUND

The CH-47 Chinook helicopter is a twin engine, tandem rotor, multi-purpose helicopter typically used in military forces around the world for troop movement, artillery emplacement and battlefield resupply. However, in recent years, the Chinook helicopter has become popular for use in civilian operations including aerial firefighting and cargo transportation due to its high lifting capacity, flexible configuration and large cabin compartment. The Chinook helicopter is equipped with three cargo hooks, which is a device mounted to a cargo hook mount disposed on the underside of the fuselage that allows for the transportation of external payloads during flight.

Currently, Chinook helicopters' firefighting capabilities are in the form of an underslung long-line bucket system or an internal tank system. The bucket system typically comprises a bucket containing fire retardant material or water that is suspended from one or more cargo hooks of the Chinook helicopter via one or more long cables. However, a disadvantage of the bucket system is that the long cables of the bucket system often limit the manoeuvrability of the Chinook helicopter. The long cables of the bucket system can also make it quite difficult and cumbersome for the pilot to accurately release water or fire retardant material on a fire, as the pilot would be required to take account of the trajectory of the bucket during flight. A further disadvantage is that the long cables of the bucket system can pose a potential risk of entanglement with trees and other objects during flight.

The internal tank system typically comprises a tank containing water or fire retardant material that is fitted in the cargo compartment of the Chinook helicopter. However, a disadvantage of internal tank systems is that they require significant and expensive modifications to be made to the Chinook helicopter so as to fit the tank into the cargo compartment. A further disadvantage is that the tank occupies significant real-estate in the cargo compartment of the Chinook helicopter, thus limiting or eliminating the use of the cargo compartment for other purposes such as transporting persons or cargo, for example.

Object

It is an object of the present disclosure to substantially overcome or at least ameliorate one or more of the above disadvantages, or to at least provide a useful alternative.

SUMMARY

In accordance with an aspect of the present disclosure, there is provided a tank assembly for a helicopter, the tank assembly comprising:

a retractable tank for storing liquid or other substances, the retractable tank having an upper frame structure with forward and rearward ends;

a first attachment mechanism attached to the upper frame structure towards the forward end and configured to engage a first cargo hook mount on the underside of the fuselage of the helicopter;

a second attachment mechanism attached to the upper frame structure towards the rearward end and configured to engage a second cargo hook mount on the underside of the fuselage of the helicopter; and a third attachment mechanism attached to the upper frame structure between the first and second attachment mechanisms and configured to engage a third cargo hook mount on the underside of the fuselage of the helicopter, wherein the first attachment mechanism substantially limits forward and rearward movement of the retractable tank when engaged to the first cargo hook mount.

The first attachment mechanism may comprise a base member attached to the upper frame structure, and a connecting member fixedly secured to the base member and configured to attach to the first cargo hook mount.

The connecting member may define a first laterally-extending aperture and a second laterally-extending aperture located rearwardly of the first laterally-extending aperture.

The tank assembly may further comprise first and second stabiliser arms extending from respective opposing sides of the upper frame structure. Each of the first and second stabiliser arms may be configured to engage a respective forward landing gear of the helicopter.

The retractable tank may further comprise a moveable lower frame structure and a flexible bag connected to the upper and lower frame structures, and wherein the lower frame structure may be moveable between a first retracted position in which the lower frame structure is substantially within or adjacent the upper frame structure, and a second extended position in which the lower frame structure is spaced from the upper frame structure such that a volume is defined within the flexible bag for storing the liquid or other substances.

The lower frame structure may be biased to the first retracted position and may move towards the second extended position in response to the amount of liquid or other substance in the volume of the flexible bag.

The lower frame structure may be biased to the first retracted position by a retraction system engaged with the upper and lower frame structures.

In accordance with another aspect of the present disclosure, there is provided a helicopter comprising:

a fuselage having an underside with forward and rearward ends;

a first cargo hook mount disposed on the underside of the fuselage towards the forward end;

a second cargo hook mount disposed on the underside of the fuselage towards the rearward end;

a third cargo hook mount disposed on the underside of the fuselage between the first and second cargo hook mounts; and a tank assembly comprising:

a retractable tank for storing liquid or other substances, the retractable tank having an upper frame structure;

a first attachment mechanism attached to the upper frame structure towards the forward end and engaged with the first cargo hook mount;

a second attachment mechanism attached to the upper frame structure towards the rearward end and engaged with the second cargo hook mount; and a third attachment mechanism attached to the upper frame structure between the first and second attachment mechanisms and engaged with the third cargo hook mount, wherein the first attachment mechanism substantially limits forward and rearward movement of the retractable tank.

The first attachment mechanism may comprise a base member attached to the upper frame structure, and a connecting member fixedly secured to the base member and attached to the first cargo hook mount.

The helicopter may further comprise two forward landing gears disposed on respective opposing sides of the fuselage. The tank assembly may further comprise first and second stabiliser arms extending from respective opposing sides of the upper frame structure. Each of the first and second stabiliser arms may be engaged with the respective forward landing gears.

Each of the forward landing gears may comprise a hitch defining an aperture. A free end portion of each of the first and second stabiliser arms may defines at least one aperture.

The helicopter may further comprise two or more fasteners for securing the first and second stabiliser arms to the hitches of the respective forward landing gears. The apertures of the first and second stabiliser arms and the apertures of the hitches of the forward landing gears may be respectively aligned and secured by respective fasteners.

The helicopter may be a CH-47 Chinook helicopter.

BRIEF DESCRIPTION OF DRAWINGS

Embodiments of the present disclosure will now be described hereinafter, by way of examples only, with reference to the accompanying drawings, in which.

DETAILED DESCRIPTION

Figure 1:
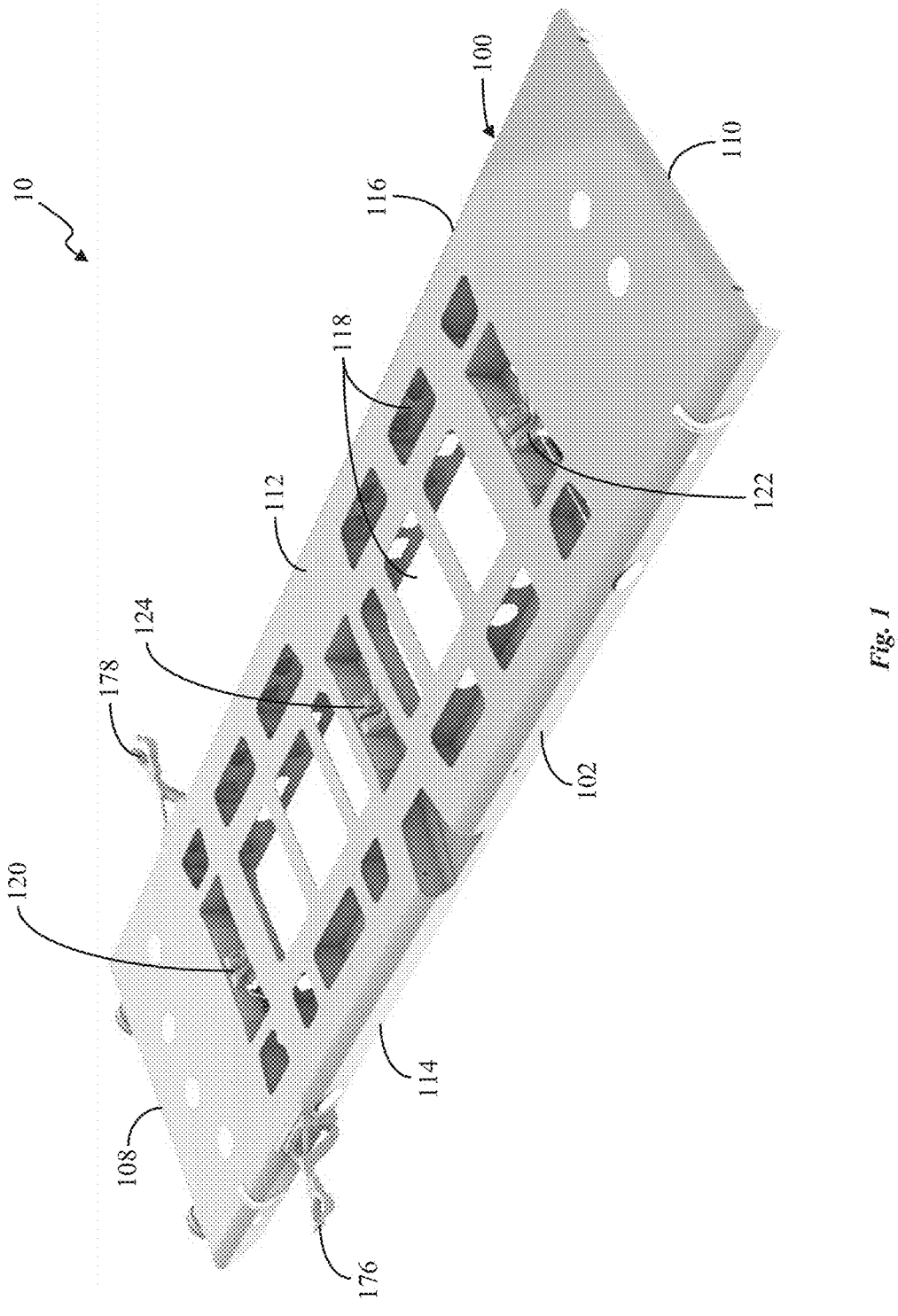
FIG. 1 is a perspective view of an embodiment of a tank assembly, with the lower frame structure in a first retracted position.
Figure 2:
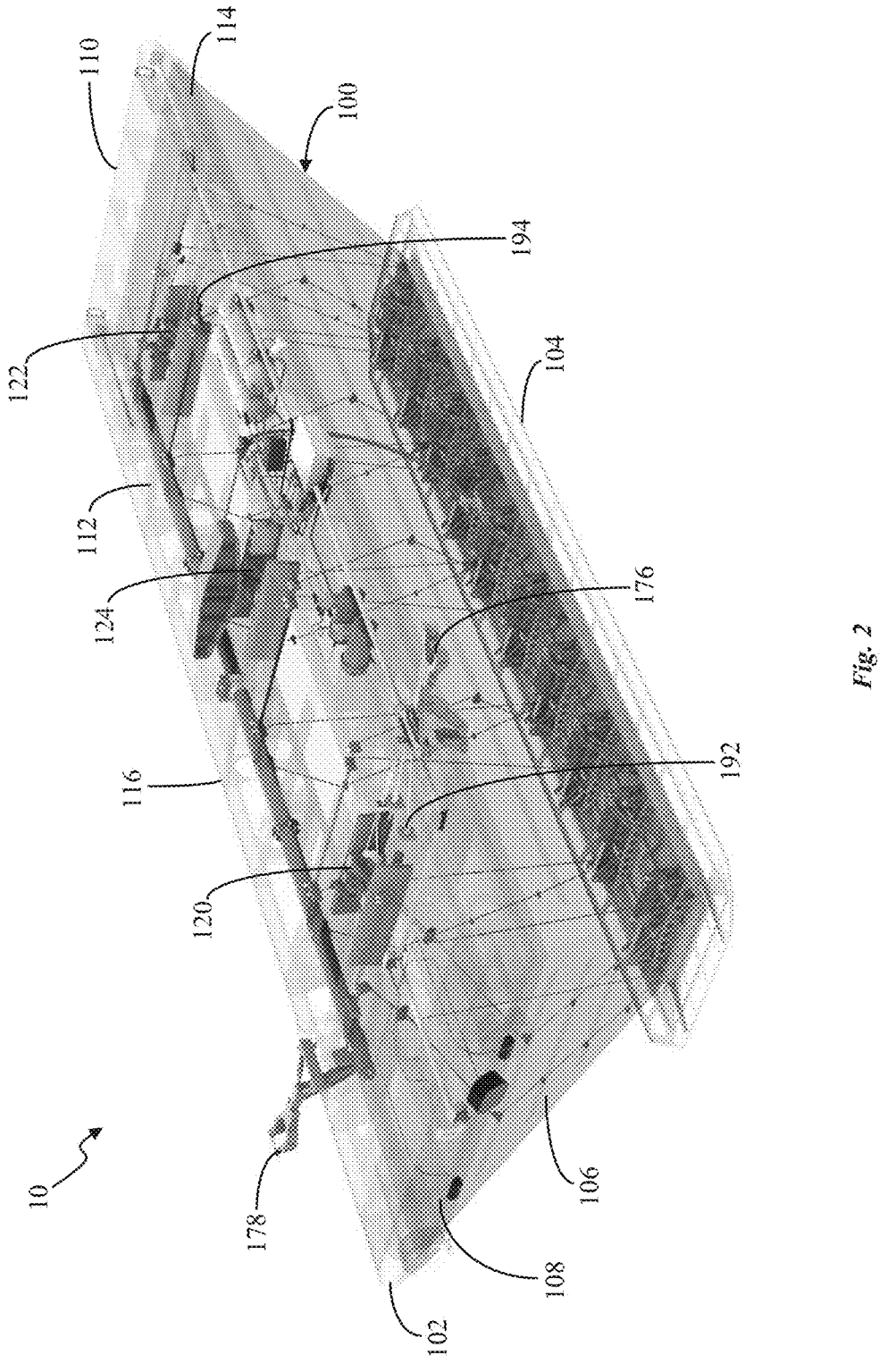
FIG. 2 is perspective view of the tank assembly of FIG. 1, with the lower frame structure in a second extended position.
Figure 3:
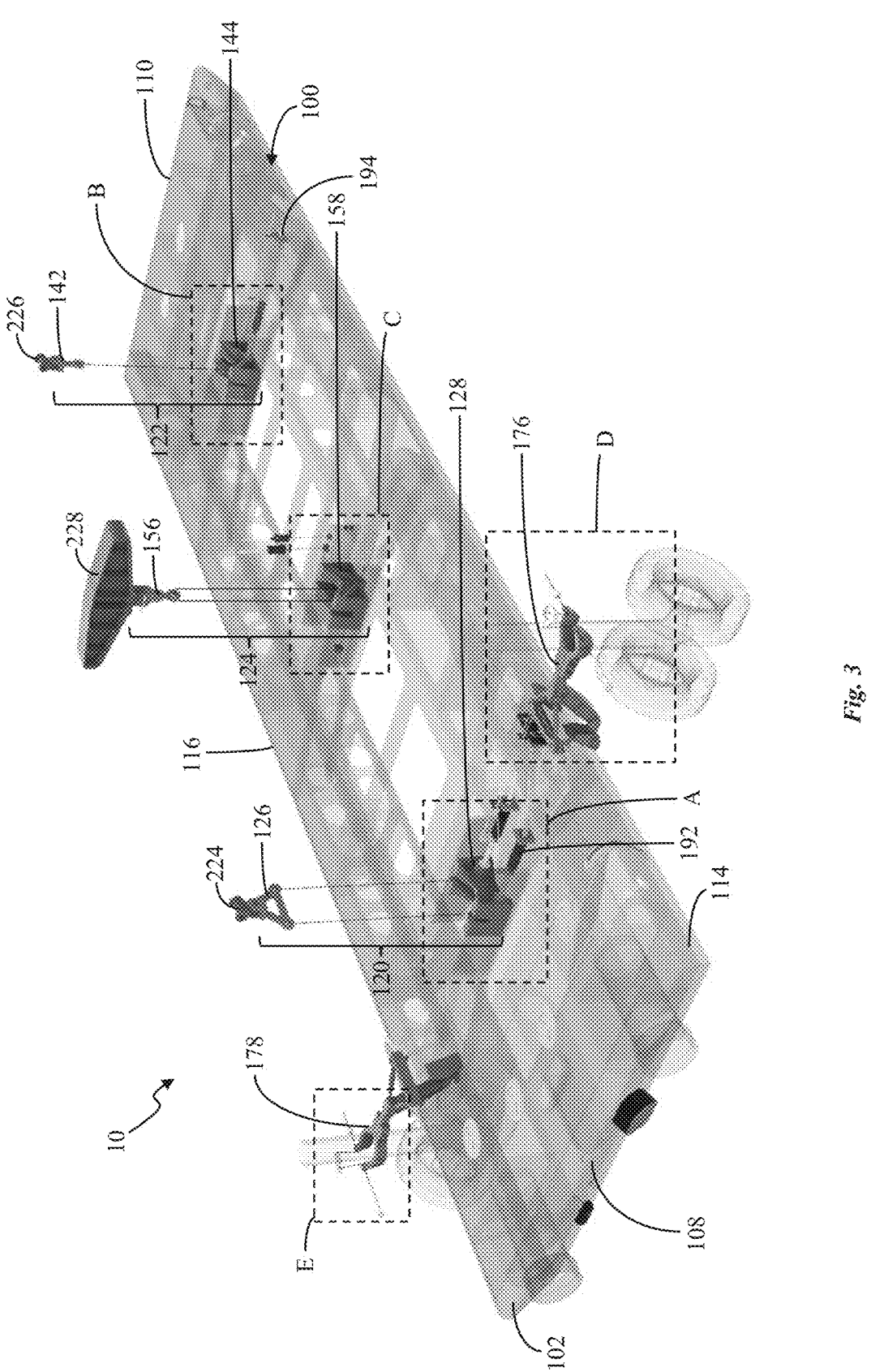
FIG. 3 is an exploded view of the tank assembly of FIG. 1.

FIGS. 1 to 3 show an embodiment of a tank assembly 10 for a helicopter 20. The tank assembly 10 comprises an elongate retractable tank 100 for storing liquid or other substances such as water or fire retardant material, for example. The retractable tank 100 comprises an upper frame structure 102, a moveable lower frame structure 104 and a flexible bag 106, in the form of a funnel-shaped bellows, which is connected to the upper and lower frame structures 102, 104. The upper frame structure 102 has a forward end 108, a rearward end 110, an upwardly-facing surface 112, and two opposing side surfaces 114, 116. The upwardly-facing surface 112 defines a plurality of openings 118. The upper and lower frame structures 102, 104 are formed from carbon fibre material or the like.

The tank assembly 10 also comprises a first attachment mechanism 120 attached to the upper frame structure 102 towards the forward end 108, a second attachment mechanism 122 attached to the upper frame structure 102 towards the rearward end 110 and a third attachment mechanism 124 attached to the upper frame structure 102 between the first and second attachment mechanisms 120, 122.

Figure 4:
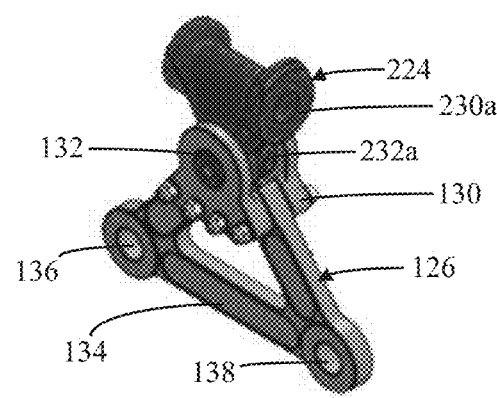
FIG. 4 is a perspective view of a connecting member of a first attachment mechanism of the tank assembly of FIG. 1, attached to a first cargo hook mount of a helicopter.
Figure 5:
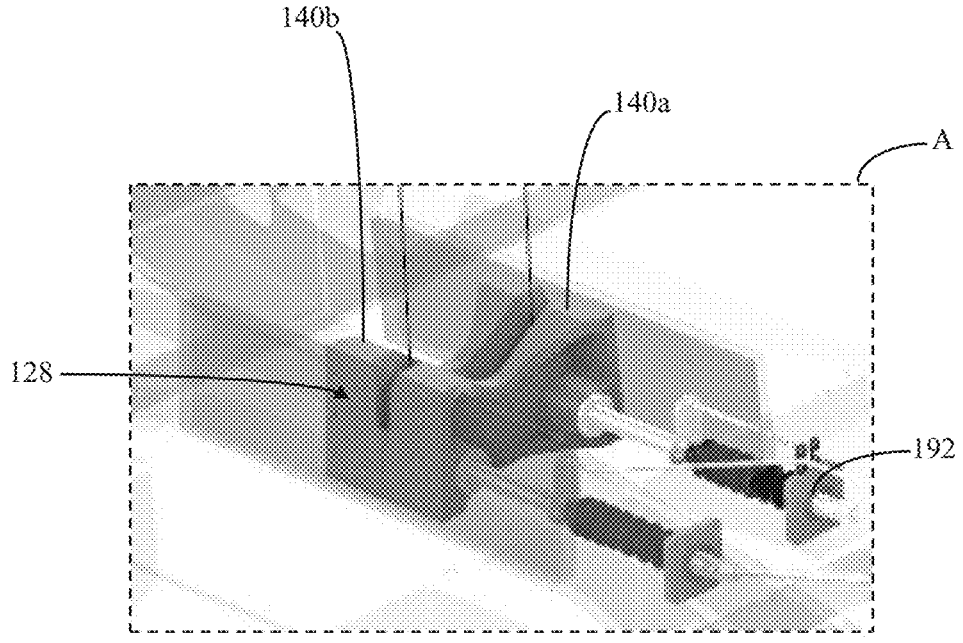
FIG. 5 is an enlarged view of A in FIG. 3.

The first attachment mechanism 120 comprises a connecting member 126 configured to engage a first cargo hook mount 224 on the underside 202 of the fuselage 200 of the helicopter 20, and a base member 128 attached to the upper frame structure 102. Referring to FIG. 4, the connecting member 126 comprises an upper portion 130 in the form of a clevis defining two opposing laterally-extending apertures 132, and a lower portion 134 extending downwardly from the upper portion 130. The lower portion 134 defines a first laterally-extending aperture 136 and a second laterally-extending aperture 138 located rearwardly of the first laterally-extending aperture 136. The base member 128, as shown in FIG. 5, comprises two inverted arch beams 140a, 140b that are parallel to one another. Each of the beams 140a, 140b defines a first laterally-extending aperture (not shown) and a second laterally-extending aperture (not shown) located rearward of the first aperture. The lower portion 134 of the connecting member 126 is secured to the base member 128 by fasteners (not shown). In this embodiment, each fastener comprises a connecting pin that transversely extends through each of the respective first and second laterally-extending apertures of the base member 128 and respective first and second laterally-extending apertures 136, 138 of the lower portion of the connecting member 126, and a locking mechanism that engages with the connecting pin to secure the connecting member 124 to the base member 128. In this embodiment, a load pin assembly 192 is also connected to the base member 128 and engaged with the connecting pins to allow for easy insertion and/or release of the connecting pins from the side of the upper frame structure 102.

Figure 6:
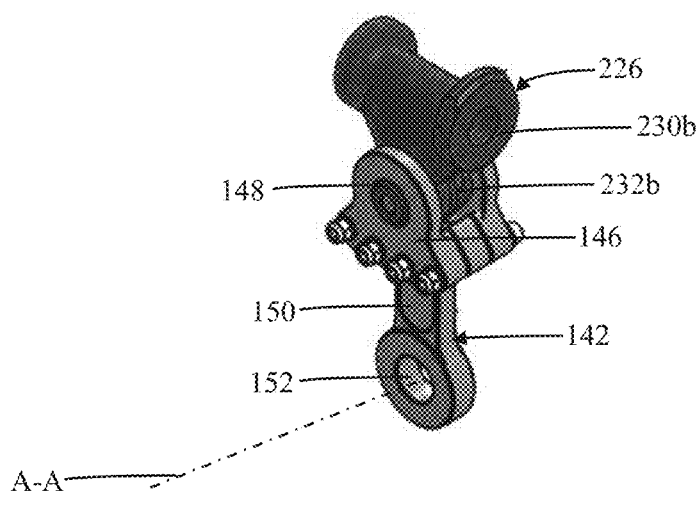
FIG. 6 is a perspective view of a connecting member of a second attachment mechanism of the tank assembly of FIG. 1, attached to a second cargo hook mount of a helicopter.
Figure 7:
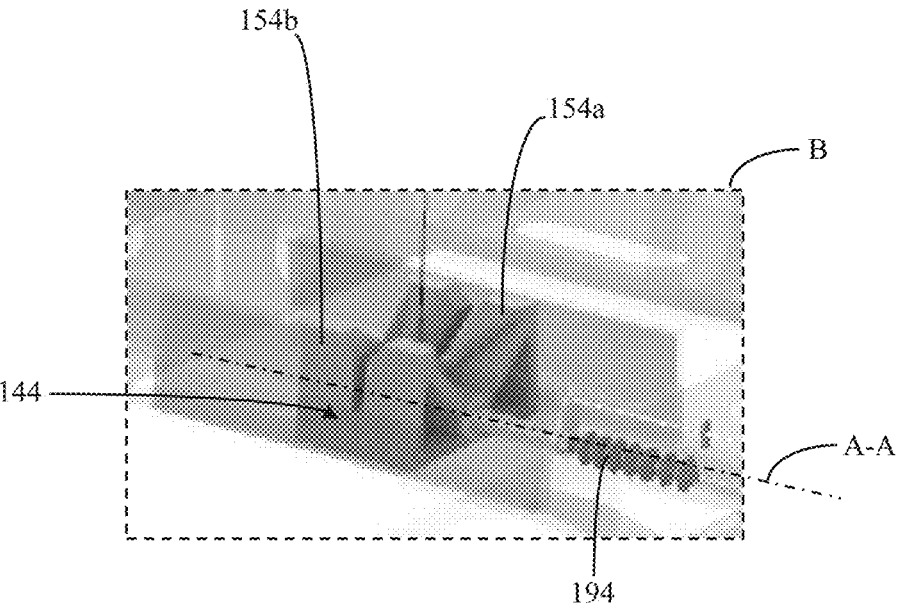
FIG. 7 is an enlarged view of B in FIG. 3.

The second attachment mechanism 122 comprises a connecting member 142 configured to engage a second cargo hook mount 226 on the underside 202 of the fuselage 200 of the helicopter 20, and a base member 144 attached to the upper frame structure 102. With reference to FIG. 6, the connecting member 142 comprises an upper portion 146 in the form of a clevis defining two opposing laterally-extending apertures 148, and a lower portion 150 extending downwardly from the upper portion 146. The lower portion 150 defines a laterally-extending aperture 152. The base member 144, as shown in FIG. 7, comprises two inverted arch beams 154a, 154b that are parallel to one another. Each of the beams 154a, 154b defines a laterally-extending aperture (not shown). The lower portion 150 of the connecting member 142 is secured to the base member 144 by a fastener (not shown). In this embodiment, the fastener comprises a connecting pin that transversely extends through each of the laterally-extending apertures of the base member 144 and the laterally-extending aperture 152 of the lower portion 150 of the connecting member 142, and a locking mechanism that engages with the connecting pin to secure the connecting member 142 to the base member 144. Engagement of the connecting pin and the laterally-extending aperture 152 of the lower portion 150 of the connecting member 142 allows the connecting member 142 to rotate about an axis A-A. In this embodiment, a load pin assembly 194 is also connected to the base member 144 and engaged with the connecting pin to allow for easy insertion and/or release of the connecting pin from the side of the upper frame structure 102.

Figure 8:
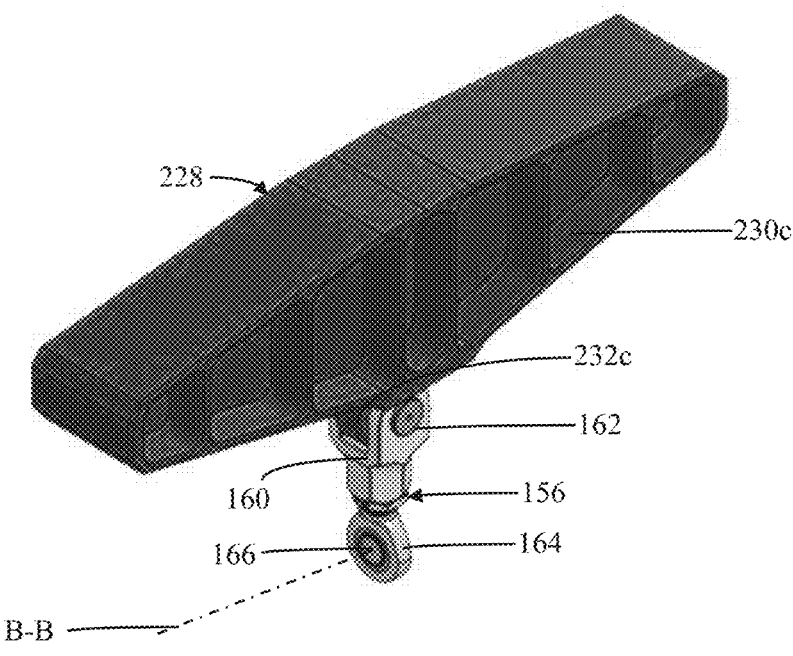
FIG. 8 is a perspective view of a connecting member of a third attachment mechanism of the tank assembly of FIG. 1, attached to a third cargo hook mount of a helicopter.
Figure 9:
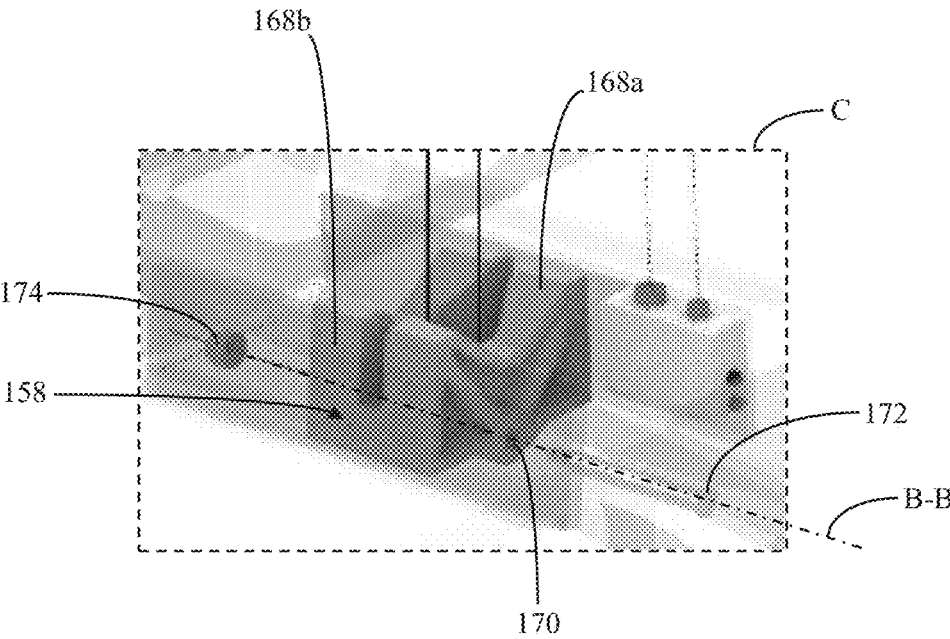
FIG. 9 is an enlarged view of C in FIG. 3.

Similarly, the third attachment mechanism 124 comprises a connecting member 156 configured to engage a third cargo hook mount 228 on the underside 202 of the fuselage 200 of the helicopter 20, and a base member 158 attached to the upper frame structure 102. With reference to FIG. 8, the connecting member 156 comprises an upper portion 160 in the form of a clevis defining two opposing longitudinally-extending apertures 162, and a lower portion 164 extending downwardly from the upper portion 160. The lower portion defines a laterally-extending aperture 166. The base member 158, as shown in FIG. 9, comprises two inverted arch beams 168a, 168b that are parallel to one another. Each of the beams 168a, 168b defines a laterally-extending aperture 170. The lower portion 164 of the connecting member 156 is secured to the base member 158 by a fastener. In this embodiment, the fastener comprises a connecting pin 172 that transversely extends through each of the laterally-extending apertures 170 of the base member 158 and the laterally-extending aperture 166 of the lower portion 164 of the connecting member 156, and a locking mechanism 174 that engages with the connecting pin 172 to secure the connecting member 156 to the base member 158. Engagement of the connecting pin 172 and the laterally-extending aperture 166 of the lower portion 164 of the connecting member 156 allows the connecting member 156 to rotate about an axis B-B.

The first, second and third attachment mechanisms 120, 122, 124 are formed from aluminium such as 6061-T6 aluminium, for example, or the like.

The tank assembly further comprises first and second stabiliser arms 176, 178 that are each configured to engage a respective forward landing gear 208, 210 of the helicopter 20. Each of the first and second stabiliser arms 176, 178 is hingedly attached to respective side surfaces 114, 116 of the upper frame structure 102 and extends outwardly from the upper frame structure 102 to a free end portion 180, 182. Each of the free end portions 180, 182 defines at least one aperture. In this embodiment, each of the free end portions 180, 182 is in the form of a clevis with two opposed apertures 184a, 184b, 186a, 186b. Further, the tank assembly 10 comprises four adjustment mechanisms 188a, 188b, 190a, 190b that are attached to the upper frame structure 102 and respective first and second stabiliser arms 176, 178. Each of the adjustment mechanisms 188a, 188b, 190a, 190b is configured to allow a user to move the respective free end portions 180, 182 of the first and second stabiliser arms 176, 178 relative to the upper frame structure 102. In this embodiment, each of the adjustment mechanisms 188a, 188b, 190a, 190b is in the form of a turnbuckle. The first and second stabiliser arms 176, 178 are formed from aluminium such as 6061-T6 aluminium, for example, or the like.

Moreover, the tank assembly 10 comprises a retraction system (not shown) having a coil spring mechanism connected to the upper frame structure 102 and a pulley system operatively connected to the coil spring mechanism and the lower frame structure 104.

The lower frame structure 104 is moveable between a first retracted position and a second extended position. In the first retracted position, the lower frame structure 104 is substantially within or adjacent the upper frame structure 102 and the flexible bag 106 is collapsed within the upper frame structure 102. The coil spring mechanism of the retraction system biases the lower frame structure 104 to the first retracted position. As liquid or other substances is introduced into the retractable tank 100 via a flexible inlet hose, the flexible bag 106 expands to define a volume therein for storing the liquid or other substances. The weight of the liquid or other substances in the flexible bag 106 causes the lower frame structure 104 to move downwardly by gravity to the second extended position, as shown in FIG. 2. In the second extended position, the lower frame structure 104 is displaced downwardly from the upper frame structure 102. The extent of downward displacement of the lower frame structure 104 from the upper frame structure 102 is dependent on the volume of liquid or other substances stored in the flexible bag 106. Downward displacement of the lower frame structure 104 relative to the upper frame structure 102 also causes tension in the coil spring mechanism of the retraction system. In this embodiment, the volume of the flexible bag 106 is about 11,000 litres (2,905 US gallons) when the flexible bag 106 is fully expanded. The plurality of openings 118 in the upwardly-facing surface 112 allows for any overflow of liquid or other substances.

The tank assembly 10 further comprises two bomb doors (not shown) that are disposed at or adjacent the lower frame structure 104 for controlling the amount of liquid or other substances to be released from the flexible bag 106. Each of the bomb doors comprises a first end pivotably attached to the lower frame structure 104 and a second opposed free end. The bomb doors are pneumatically-operated via a controller (not shown). Each of the bomb doors is movable between a closed position in which the free end is at or substantially adjacent the lower frame structure 104, and an open position in which the free end is displaced downwardly from the lower frame structure 104 to allow the liquid or other substances to be released by gravity from the flexible bag 106. In some embodiments, the bomb doors may be controlled individually or simultaneously by the controller to provide various release patterns depending on fire suppression requirements. For example, the controller may provide Full Open, ½ Open, ⅓ Open or ¼ Open modes. Additionally or optionally, the controller may also provide a Full Open failsafe mode, in which the bomb doors remain open to release all of the liquid or other substances stored in the flexible bag 106 in the event of any electrical faults or an emergency.

When either of the bomb doors are in the open position and the liquid or other substances is released from the flexible bag 106, the lower frame structure 104 automatically moves upwards towards the first retracted position due to the bias of the tension in the coil spring mechanism. It will be appreciated that the lower frame structure 104 will remain displaced from the upper frame structure 102 so long as liquid or other substances remain in the flexible bag 106.

Figure 10:
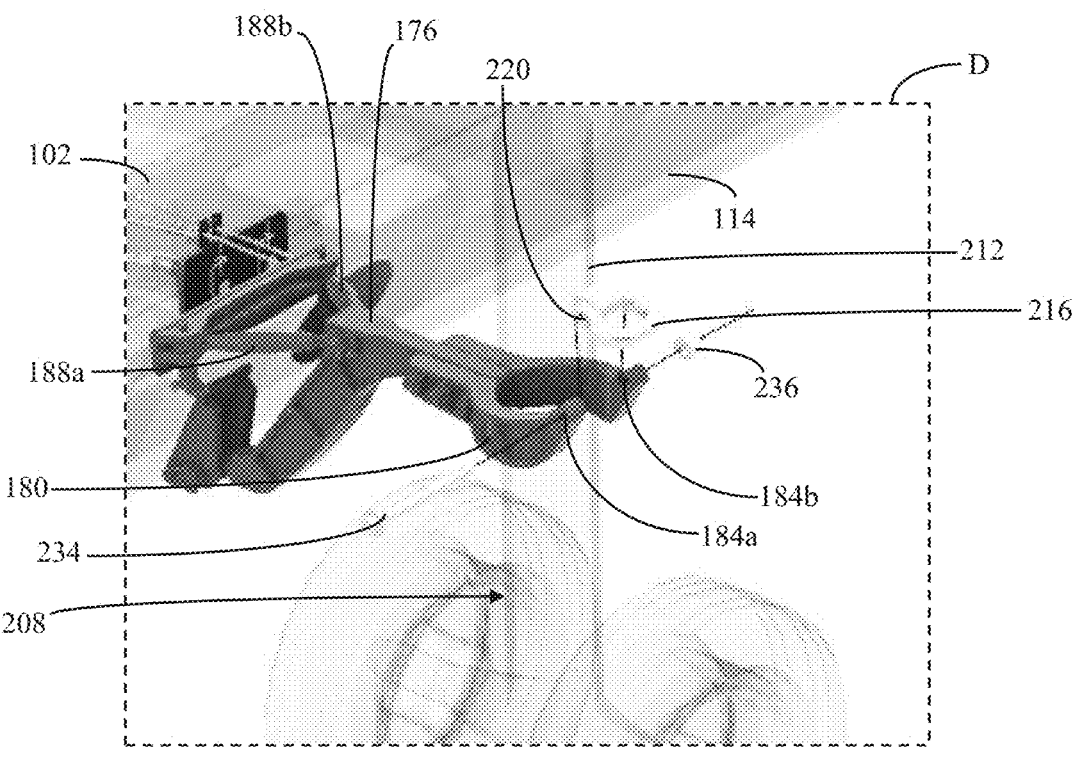
FIG. 10 is an enlarged view of D in FIG. 3.
Figure 11:
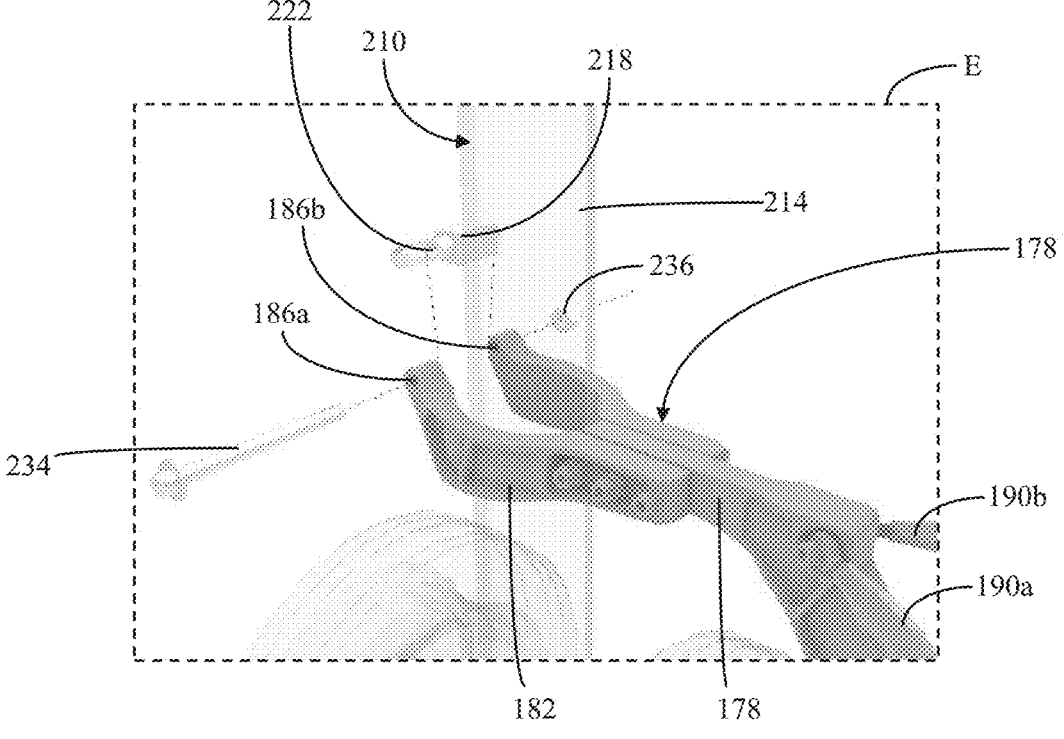
FIG. 11 is an enlarged view of E in FIG. 3.
Figure 12:
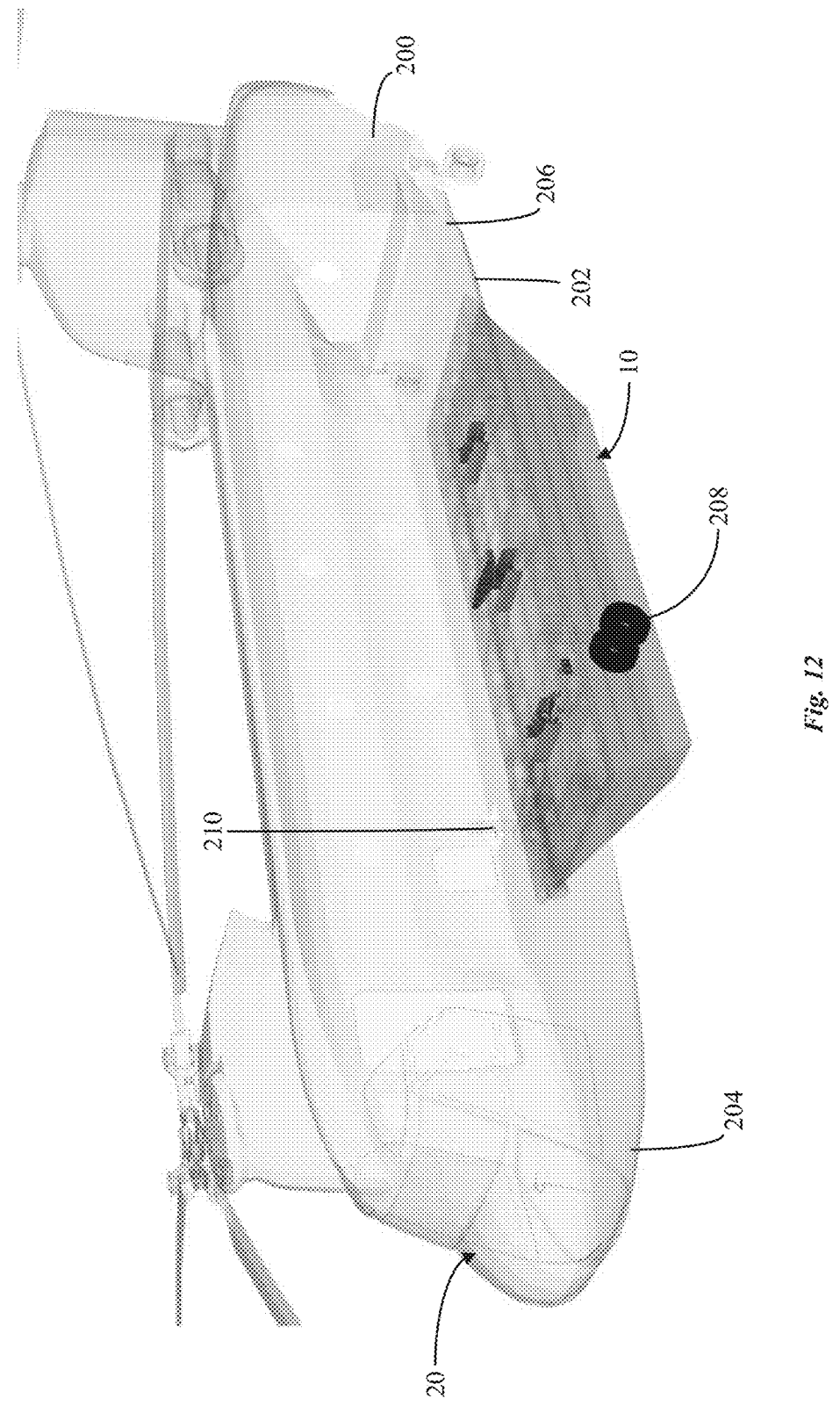
FIG. 12 is a perspective view of an embodiment of a helicopter with the tank assembly of FIG. 1 attached thereto.

FIG. 12 shows an embodiment of a helicopter 20 with the tank assembly 10 mounted thereto. The helicopter 20 may be a CH-47 Chinook helicopter. The helicopter 20 comprises a fuselage 200 having an underside 202 with forward and rearward ends 204, 206. The helicopter 20 also comprises two forward landing gears 208, 210 disposed respectively on opposing sides of the fuselage 200. Each of the forward landing gears 208, 210 has a shaft 212, 214 and a hitch 216, 218, in the form of a shackle, attached to the shaft 212, 214, as best shown in FIGS. 10 and 11. Each hitch 216, 218 defines an aperture 220, 222 extending therethrough.

With reference to FIGS. 3, 4, 6 and 8, a first cargo hook mount 224 is disposed on the underside 202 of the fuselage 200 towards the forward end 204, a second cargo hook mount 226 is disposed on the underside 202 of the fuselage 200 towards the rearward end 206 and a third cargo hook mount 228 is disposed on the underside 202 of the fuselage 200 between the first and second cargo hook mounts 224, 226. Each of the cargo hook mounts 224, 226, 228 is of the type used for directly mounting a known cargo hook thereon and comprises an upper portion 230a, 230b, 230c mounted to the underside 202 of the fuselage 200 and a lower portion 232a, 232b, 232c extending downwardly from the upper portion 230a, 230b, 230c. Each of the lower portions 232a, 232b of the first and second cargo hook mounts 224, 226 comprises a laterally-extending aperture (not shown), and the lower portion 232c of the third cargo hook mount 228 comprises a longitudinally-extending aperture (not shown).

The tank assembly 10 is attached to the helicopter 20 at five locations, that being at each of the first, second and third cargo hook mount locations and the two forward landing gear mount locations.

Referring to FIGS. 2, 3, 4 and 12, at the first cargo hook mount location, the upper portion 130 of the connecting member 126 of the first attachment mechanism 120 receives the lower portion 232a of the first cargo hook mount 224 such that the apertures 132 of the upper portion 130 and the aperture of the lower portion 232a are respectively aligned. A fastener in the form of a self-locking pin extends through the apertures 132 of the upper portion 130 of the connecting member 126 of the first attachment mechanism 120 and the aperture of the lower portion 232a of the first cargo hook mount 224, thereby fixedly attaching the first attachment mechanism 120 to the first cargo hook mount 224. Engagement of the connecting pins and the respective first and second laterally-extending apertures 136, 138 of the lower portion 134 of the connecting member 126 substantially limits forward and rearward movement of the retractable tank 10 when engaged to the first cargo hook mount 224.

Referring to FIGS. 2, 3, 6 and 12, at the second cargo hook mount location, the upper portion 146 of the connecting member 142 of the second attachment mechanism 122 receives the lower portion 232b of the second cargo hook mount 226 such that the apertures 148 of the upper portion 146 and the aperture of the lower portion 232b are respectively aligned. A fastener in the form of a self-locking pin extends through the apertures 148 of the upper portion 146 of the connecting member 142 of the second attachment mechanism 122 and the aperture of the lower portion 232b of the second cargo hook mount 226, thereby fixedly attaching the second attachment mechanism 122 to the second cargo hook mount 226.

Referring to FIGS. 2, 3, 8 and 12, at the third cargo hook mount location, the upper portion 160 of the connecting member 156 of the third attachment mechanism 124 receives the lower portion 232c of the third cargo hook mount 228 such that the apertures 162 of the upper portion 160 and the aperture of the lower portion 232c are respectively aligned. A fastener in the form of a quick-release pin extends through the apertures 162 of the upper portion 160 of the connecting member 156 of the third attachment mechanism 124 and the aperture of the lower portion 232c of the third cargo hook mount 228, thereby releasably attaching the third attachment mechanism 124 to the third cargo hook mount 228.

Referring to FIGS. 3, 10 and 11, at the two forward landing gear mount locations, the free end portions 180, 182 of the first and second stabiliser arms 176, 178 are respectively positioned at the forward landing gears 208, 210 such that the shafts 212, 214 of the forward landing gears 208, 210 are received by the respective free end portions 180, 182 and the apertures 184a, 184b, 186a, 186b of the free end portions 180, 182 and the apertures 220, 222 of the hitches 216, 218 are respectively aligned. In each alignment, a fastener in the form of a connecting pin 234 extends respectively through the apertures 184a, 184b, 186a, 186b of the free end portions 180, 182 and the apertures 220, 222 of the hitches 216, 218, and a fastening mechanism 236 engages the connecting pin 234 thereby fixedly attaching the first and second stabiliser arms 176, 178 to the respective forward landing gears 208, 210. A user can move the free end portions 180, 182 relative to the upper frame structure 102 by manipulating the adjustment mechanisms 188a, 188b, 190a, 190b to facilitate positioning of the free end portions 180, 182. Attachment of the first and second stabiliser arms 176, 178 to the forward landing gears 208, 210 substantially reduces torsional loads on the tank assembly 10 when the helicopter 20 is airborne.

The controller for pneumatically-operating the bomb doors is located onboard the helicopter 20, specifically in the cockpit, to allow a pilot of the helicopter 20 to control the release of liquid or other substances stored in the flexible bag 106.

The embodiments described above has numerous advantages. For example, the tank assembly 10 provides a simple and effective retrofitting solution for improving the firefighting capabilities of Chinook helicopters without requiring significant and expensive modifications to be made to the helicopters 20. By utilising the three cargo hook mounts 224, 226, 228 and the forward landing gears 208, 210 of the helicopter 20 together, the helicopter 20 is able to support the downward load of the tank assembly 10 with the fully expanded flexible bag 106.

The tank assembly 10 is also easy to manufacture and can be easily attached to, and removed from, the helicopter 20. Further, the tank assembly 10 is designed such that it occupies minimal real-estate externally of the helicopter 20, thus not affecting the manoeuvrability and performance of the helicopter 20. For example, the lower frame structure 104 can be maintained in the first retracted position so that the retractable tank 100 does not obstruct ground movement of the helicopter 20, and the lower frame structure 104 is moveable to the second extended position to maximise the capacity of the flexible bag 106 when the helicopter 20 is airborne. Fitting the tank assembly 10 external to the helicopter 20 also allows the cargo compartment of the helicopter 20 to be used for other purposes such as transporting persons or cargo.

Further still, the retraction system may be accessed externally by a user for adjustment and servicing via the plurality of openings 118 whilst the tank assembly 10 is attached to the helicopter 20, thus not requiring the tank assembly 10 to be removed from the helicopter 20. Moreover, the funnel shape of the expanded flexible bag 106 increases the head pressure of the retractable tank 100 to allow a more effective canopy penetration of the released liquid or other substances for extinguishing fires.

Using pneumatic systems to operate the bomb doors in the above embodiments also provides advantages over hydraulic systems. For example, in hydraulic systems, hydraulic pressures may continually produce errors in the electronics of the tank assembly 10 as constant minor changes in hydraulic pressure limits may cause excessive traffic between solenoids of the tank assembly 10, hydraulic pressure sensors and pilot control systems. These problems may be overcome or ameliorated by using pneumatic systems, rather than hydraulic system, to operate the bomb doors.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A tank assembly for a helicopter, the tank assembly comprising:
   a retractable tank for storing liquid or other substances, the retractable tank having an upper frame structure with forward and rearward ends;
   a first attachment mechanism attached to the upper frame structure towards the forward end, the first attachment mechanism comprising a base member attached to the upper frame structure, and a connecting member fixedly secured to the base member and configured to attach to a first cargo hook mount on an underside of a fuselage of the helicopter, the connecting member defining a first laterally-extending aperture and a second laterally-extending aperture located rearwardly of the first laterally-extending aperture;
   a second attachment mechanism attached to the upper frame structure towards the rearward end and configured to engage a second cargo hook mount on the underside of the fuselage of the helicopter; and
   a third attachment mechanism attached to the upper frame structure between the first and second attachment mechanisms and configured to engage a third cargo hook mount on the underside of the fuselage of the helicopter,
   wherein the first attachment mechanism substantially limits forward and rearward movement of the retractable tank when engaged to the first cargo hook mount.

2. The tank assembly according to claim 1, wherein the retractable tank further comprises a moveable lower frame structure and a flexible bag connected to the upper and lower frame structures, and
   wherein the lower frame structure is moveable between a first retracted position in which the lower frame structure is substantially within or adjacent the upper frame structure, and a second extended position in which the lower frame structure is spaced from the upper frame structure such that a volume is defined within the flexible bag for storing the liquid or other substances.

3. The tank assembly according to claim 2, wherein the lower frame structure is biased to the first retracted position and moves towards the second extended position in response to the amount of liquid or other substance in the volume of the flexible bag.

4. The tank assembly according to claim 3, wherein the lower frame structure is biased to the first retracted position by a retraction system engaged with the upper and lower frame structures.

5. A helicopter comprising:
   a fuselage having an underside with forward and rearward ends;
   a first cargo hook mount disposed on the underside of the fuselage towards the forward end;
   a second cargo hook mount disposed on the underside of the fuselage towards the rearward end;
   a third cargo hook mount disposed on the underside of the fuselage between the first and second cargo hook mounts; and a tank assembly comprising:
   a retractable tank for storing liquid or other substances, the retractable tank having an upper frame structure;
   a first attachment mechanism attached to the upper frame structure towards the forward end, the first attachment mechanism comprising a base member attached to the upper frame structure, and a connecting member fixedly secured to the base member and attached to the first cargo hook mount, the connecting member defining a first laterally-extending aperture and a second laterally-extending aperture located rearwardly of the first laterally-extending aperture;
   a second attachment mechanism attached to the upper frame structure towards the rearward end and engaged with the second cargo hook mount; and
   a third attachment mechanism attached to the upper frame structure between the first and second attachment mechanisms and engaged with the third cargo hook mount,
   wherein the first attachment mechanism substantially limits forward and rearward movement of the retractable tank.

6. The helicopter according to claim 5, further comprising two forward landing gears disposed on respective opposing sides of the fuselage, and wherein the tank assembly further comprises first and second stabiliser arms extending from respective opposing sides of the upper frame structure, each of the first and second stabiliser arms being engaged with the respective forward landing gears.

7. The helicopter according to claim 6, wherein each of the forward landing gears comprises a hitch defining an aperture, and wherein a free end portion of each of the first and second stabiliser arms defines at least one aperture.

8. The helicopter according to claim 7, further comprising two or more fasteners for securing the first and second stabiliser arms to the hitches of the respective forward landing gears, and wherein the apertures of the first and second stabiliser arms and the apertures of the hitches of the forward landing gears are respectively aligned and secured by respective fasteners.

9. The helicopter according to claim 5, wherein the helicopter is a CH-47 Chinook helicopter.

10. A tank assembly for a helicopter, the tank assembly comprising:
   a retractable tank for storing liquid or other substances, the retractable tank having an upper frame structure with forward and rearward ends;
   a first attachment mechanism attached to the upper frame structure towards the forward end and configured to engage a first cargo hook mount on an underside of a fuselage of the helicopter, wherein the first attachment mechanism substantially limits forward and rearward movement of the retractable tank when engaged to the first cargo hook mount;
   a second attachment mechanism attached to the upper frame structure towards the rearward end and configured to engage a second cargo hook mount on the underside of the fuselage of the helicopter;
   a third attachment mechanism attached to the upper frame structure between the first and second attachment mechanisms and configured to engage a third cargo hook mount on the underside of the fuselage of the helicopter; and
   first and second stabiliser arms extending from respective opposing sides of the upper frame structure, each of the first and second stabiliser arms being configured to engage a respective forward landing gear of the helicopter.

\* \* \* \* \*